UNITED STATES PATENT OFFICE.

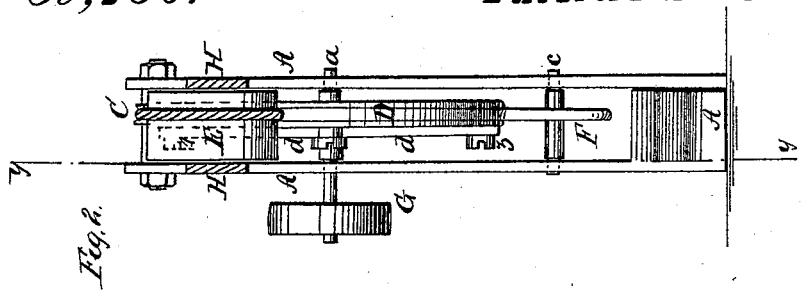
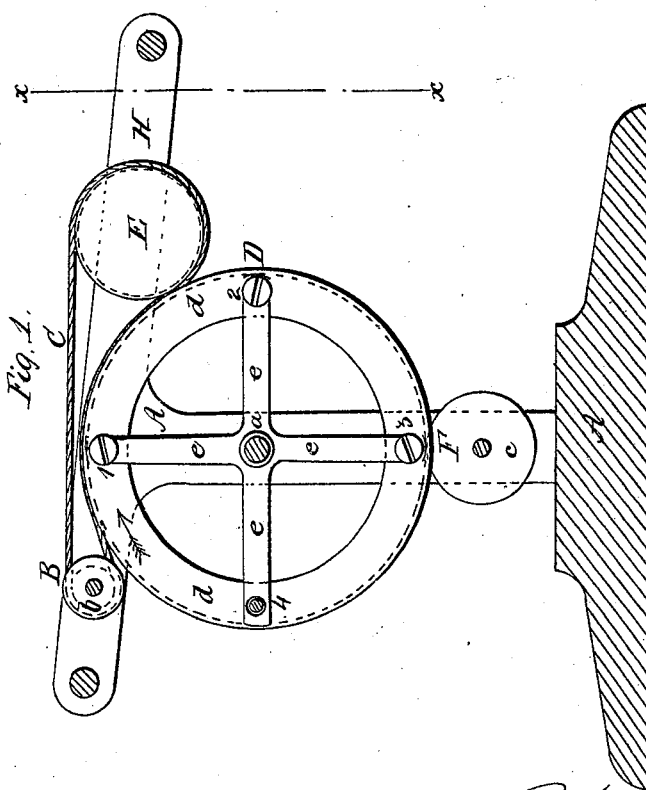

R. W. PARKER, OF WOBURN, MASSACHUSETTS.

IMPROVEMENT IN PULLEYS.

Specification forming part of Letters Patent No. 59,256, dated October 30, 1866.

*To all whom it may concern:*

Be it known that I, ROBERT W. PARKER, of Woburn, in the county of Middlesex and State of Massachusetts, have invented a new and useful Improvement in Pulleys; and I do hereby declare that the following is a full, clear, and exact description thereof, which will enable others skilled in the art to make and use the same, reference being had to the accompanying drawings, forming part of this specification, in which—

Figure 1 is a side elevation of pulleys and connections, showing them cut vertically on the line *y y*, Fig. 2. Fig. 2 is an end elevation of the same and vertical cross-section in part through the line *x x*, Fig. 1.

Similar letters of reference indicate like parts.

My invention relates to the construction of pulleys and their connection for transmitting motion to machinery by means of belting applied to a segment only of the periphery of the driving-pulley, being an improvement on my banding-pulleys for which Letters Patent were granted to me February 17, 1852.

The object of this improvement is to establish a compensating movement between the belt or band and the pulleys when in motion, so that they shall be perfectly self-adjusting, and, by the freedom with which they play within certain practical limits, shall be able to meet and neutralize the deranging effect occasioned by inequality in the belting or banding employed, or a sudden and violent change in the speed of the machinery—defects of operation to which my old arrangement of the pulleys working the banding was subject, especially with large machinery, now entirely corrected.

A frame, on which the pulleys are hung for exemplification merely, is designated by A. The motion is to be transmitted to a speed-pulley (marked B) by a belt or band, C, (which may be round or flat,) and passes over the upper side of the periphery of the driving-pulley D, and around a loose self-adjusting roller or detached revolving weight, E, both of which are special subjects of my invention, to be hereinafter more fully explained.

Below the pulley D, and bearing up against it, is a friction-wheel, F. In Fig. 2, G is a pulley on the shaft *a a* of the driving-pulley D, through which the power is transmitted from its source when necessary. The pulley B and wheel F are on shafts *b c*. The loose revolving weight E is not hung on a shaft or journal, though circular in its form, and is made heavy by the thickness of the metal, as well as the diameter in proportion to the size of the pulleys D B and the power required in the machinery. Instead of a fixed center for its axis, revolving on a journal, it plays between two flat bars or guides, H H, Fig. 2, which fit closely to its sides in a line with the planes of the pulleys D B, and prevent it from getting out of place sidewise, while it has no tendency to rise upward, and is kept from falling by the belt C, on which it swings and plays freely, the center being in a line below the level of the top of the pulley D.

The pulley D is very peculiar in its construction. It consists of a strong rim, *d*, attached to the extremity of four strong arms, *e e e e*, which are fastened at the ends by set-screws 1 2 3 4. The holes in the arms *e e* are made larger than the shanks of the set-screws 1 2 3 4, as shown at No. 4, Fig. 1. The screws are not driven tight against the arms, and allow the rim *d* to move to and fro in different directions sufficiently to adjust itself to any inequalities in the belting C, or a jar from any cause in the action of the machinery, thus preserving perfect regularity of motion.

The operation of these pulleys is obvious. The driving-pulley D, on being turned from left to right, as indicated by the arrow, impels the belt C to travel over the speed-pulley B by the friction of the upper part of the rim *d*, on which it bears by the heft of the loose roller or revolving weight E. The rim *d* of the pulley D rests on the friction-wheel F, which supports and prevents it from falling or changing its line of motion horizontally.

Having described my invention, I wish particularly to distinguish my present improvements on pulleys from those on banding under my patent of February 17, 1852, and to disclaim the arrangement of the belting or banding traveling on a segment only of the rim of the driving-pulley D, which I have found to be a valuable device for transmitting motion in the saving of friction by the substitution of one belt for two, but attended with practical difficulties which are overcome by my compensating and self-adjusting pulleys.

What I wish to claim, therefore, and secure by Letters Patent, is—

1. The pulley D, with its movable rim $d$, attached to the arms $e\ e\ e\ e$ by the screws 1 2 3 4, through holes in the ends larger than the shanks of the screws, in combination with the friction-wheel F, or their equivalents, constructed substantially in the manner and for the purposes described.

2. The loose self-adjusting roller or detached revolving weight E, in combination with the belt C and the pulley D, constructed and operated substantially as and for the purposes herein set forth.

ROBERT W. PARKER.

Witnesses:
PARKER L. CONVERSE,
SHERMAN CONVERSE.